United States Patent
Bühler et al.

(10) Patent No.: US 7,501,782 B2
(45) Date of Patent: Mar. 10, 2009

(54) METHOD AND APPARATUS FOR CONTROLLING A MAGNETIC BEARING DEVICE

(75) Inventors: Philipp Bühler, Zürich (CH); René Larsonneur, Winterthur (CH)

(73) Assignee: Mecos Traxler AG, Winterthur (CH)

(*) Notice: Subject to any disclaimer, the term of this patent is extended or adjusted under 35 U.S.C. 154(b) by 103 days.

(21) Appl. No.: 11/658,886

(22) PCT Filed: Jul. 26, 2005

(86) PCT No.: PCT/CH2005/000439

§ 371 (c)(1),
(2), (4) Date: Jan. 30, 2007

(87) PCT Pub. No.: WO2006/010285

PCT Pub. Date: Feb. 2, 2006

(65) Prior Publication Data

US 2007/0296367 A1    Dec. 27, 2007

(30) Foreign Application Priority Data

Jul. 30, 2004    (EP)    ................... 04405486

(51) Int. Cl.
*G05B 1/02*    (2006.01)
(52) U.S. Cl. ................ 318/607; 318/608; 318/623; 310/90.5; 417/423.4; 417/423.12
(58) Field of Classification Search ............ 318/607, 318/608, 623, 590; 310/90.5; 417/423.4, 417/423.12
See application file for complete search history.

(56) References Cited

U.S. PATENT DOCUMENTS

| | | | |
|---|---|---|---|
| 4,686,404 A * | 8/1987 | Nakazeki et al. | 310/90.5 |
| 4,697,128 A | 9/1987 | Matsushita et al. | |
| 4,841,212 A * | 6/1989 | Matsushita et al. | 318/607 |
| 4,885,491 A | 12/1989 | Hiyama et al. | |
| 5,142,177 A * | 8/1992 | Higuchi et al. | 310/90.5 |
| 5,247,219 A * | 9/1993 | Nakagawa et al. | 310/90.5 |
| 6,140,790 A | 10/2000 | Fleury et al. | |
| 6,455,966 B1 * | 9/2002 | Barada et al. | 310/90.5 |
| 6,734,650 B2 * | 5/2004 | Abel | 318/623 |

(Continued)

FOREIGN PATENT DOCUMENTS

EP    0 560 234 A    9/1993

*Primary Examiner*—Bentsu Ro
*Assistant Examiner*—Thai Dinh
(74) *Attorney, Agent, or Firm*—Sughrue Mion, PLLC

(57) ABSTRACT

A method and a controller for controlling a magnetic bearing device, in which a rotor is suspended for rotation around a shaft, are disclosed. Sensor signals are transformed to yield tilt displacement signals (Sθx, Sθy) which correspond to tilting displacements of the shaft in predetermined directions (x, y). From the tilt displacement signals (Sθx, Sθy), tilt control signals Aθx, Aθy) are derived; these are transformed to yield actuator control signals for driving electromagnetic actuators in the magnetic bearing device. According to the invention, tilting displacements for which the tilt vector rotates about the device axis (z) with a first predetermined sense of rotation are controlled separately from tilting displacements for which the tilt direction vector rotates about the device axis (z) with a second sense of rotation opposite to the first predetermined sense of rotation. In this way, control of nutation and precession can be achieved without influence from blade vibrations or shaft bending modes.

18 Claims, 10 Drawing Sheets

U.S. PATENT DOCUMENTS 6,809,449 B2 * 10/2004 Shinozaki .................. 310/90.5
6,984,907 B2 * 1/2006 Barada ...................... 310/90.5

2003/0080638 A1   5/2003  Hiroyuki

* cited by examiner

METHOD AND APPARATUS FOR CONTROLLING A MAGNETIC BEARING DEVICE

FIELD OF THE INVENTION

The present invention relates to the control of a magnetic bearing device, in which a rotor is suspended for rotation about a rotation axis. Specifically, the present invention relates to a method for controlling a magnetic bearing device according to the preamble of claim 1 and to a controller for such a bearing device according to the preamble of claim 5. Furthermore, the invention relates to a magnetic bearing device according to claim 11 and a turbo-molecular pump according to claim 12.

BACKGROUND OF THE INVENTION

Magnetic bearings are useful in a variety of applications in which a rotor is to be rotated in a contact-free manner. Applications of magnetic bearings include, e.g., turbo-molecular pumps (TMPs).

A rotor suspended in a magnetic bearing device for rotation around a rotor shaft can be described, to a first approximation, as a rigid object having six spatial degrees of freedom (DOFs). One DOF is the rotation around the device axis, whose direction will be designated as z in the following. This DOF is usually driven by an electromotor. Excitation of the other five degrees of freedom is undesired. These five degrees of freedom can be separated into three translational degrees of freedom (translational motions of the center of mass of the rotor in three directions x, y, and z, where x and y designate two mutually orthogonal axes perpendicular to the z direction) and two rotational degrees of freedom (tilting motions of the rotor around the x and y axes with fixed center of mass).

Control of these degrees of freedom is generally achieved by providing position and/or velocity sensors in various locations, feeding the sensor signals to a controller, and providing control signals for the actuators of the magnetic bearings at the controller outputs. At least five sensors are needed to control five degrees of freedom. Often, these sensors are: one sensor measuring displacements along the device axis (z); and two sensors each in an upper and a lower position along the device axis, for measuring displacements of an upper and a lower section of the shaft in the x and y directions.

A translational motion leads to the same displacement of both shaft sections. As an example, a translation in the x direction induces the same signal in an upper and a lower x sensor. A tilt leaves the center of mass unaffected and leads to different displacements of the upper and lower sections. A tilt, say, around the x axis leads to displacements in the y direction. In this sense, in this document reference to tilts "in" particular directions will be made: A tilt in a particular direction (called the tilt direction) is to be understood as a tilt in the plane spanned by the tilt direction and the z axis, or, equivalently, as a tilt around an axis (called the tilt axis) perpendicular to the tilt direction and the z axis. Mathematically, a tilt can be properly described by a tilt vector. The tilt vector is a unit vector pointing in the direction of the tilt axis, multiplied by the tilt angle.

In the controller, the signals from the upper and lower x and y sensors are transformed by forming weighted sums and differences to yield measures for translational displacements and/or velocities of the center of mass in the x and y directions, respectively, and for tilting displacements and/or angular velocities around the x and y axes, respectively. Traditionally, each of the three translational DOFs and the two tilting DOFs is then controlled separately by an individual control unit for each DOF. The outputs of these units are finally transformed back to generate driving signals for each actuator coil of the magnetic bearings. This control scheme can be readily generalized for the case where more than five sensors are employed. An example for such a traditional controller with ten sensor inputs organized in five pairs can be found in FIG. 2 of GB 2 109 596 A.

However, for rapidly rotating rotors, such a control scheme often does not achieve good results in controlling the tilting motions. One reason for this can be found in the gyroscopic character of the rotor. For a rigid rotor rotating at a high angular velocity, eigenmodes contributing to the tilting displacements are the precession and nutation modes. Precession and nutation are well-known effects in the theory of a rigid top; details can be found in standard textbooks of mechanics. The importance of these gyroscopic modes has been recognized in the art, and several approaches have been suggested for dealing with such gyroscopic effects. An important feature of the gyroscopic character of these modes is that a force in some direction may cause displacements in a different direction (or in other words, a moment of force around a given direction may cause angular displacements around a different direction). Therefore, a gyroscopic mode is properly controlled by applying forces not only in the opposite direction of a given displacement and/or velocity (say, along the x direction), but also in a direction perpendicular to the displacement resp. velocity (say, along the y direction).

In DE 33 23 648 A1, a cross-coupling scheme is proposed, in which an input signal for a tilt in the x direction does not only result in an output signal for the bearings in the x direction, but in which this input signal also causes an output signal in the y direction. Similarly, a tilt signal in the y direction also causes an output signal for the x bearings, however with opposite sign. In this way, the nutation mode can be controlled.

A similar scheme is proposed in GB 2 109 596 A. In that document the signs of the cross couplings are chosen opposite to DE 33 23 648 A1, such that the precession mode is controlled.

In EP 0 185 765, a cross-coupling scheme was proposed in which bandpass filters are employed in the cross-coupling branches. In this way, only tilting motions within a certain fixed frequency band lead to cross couplings. The frequency band is chosen such that the precession mode is identified by its frequency.

In U.S. Pat. No. 4,885,491 a control scheme employing cross couplings is disclosed, in which both a bandpass filter and a lowpass filter are employed in each cross-coupling branch, however, with opposite signs at their outputs. Additionally, the gain in the cross-coupling branches depends on the rotation frequency. This allows precession and nutation to be discriminated by their frequencies. Control is then performed dependent on the such-identified mode.

However, the control schemes of the prior art still often fail to achieve good, stable control at high rotation frequencies. This might be attributed to other disturbances superposed to a pure rigid-body behavior. This problem appears to be particularly strong in TMPs.

U.S. Pat. No. 4,697,128 employs a tracking filter at the rotational frequency for compensating unbalance vibrations of the rotor which are synchronous with the rotational frequency. As the tracking filter is centered at the rotational frequency, and only translational displacements are used as input signals, this method is only useful for unbalance compensation and cannot be applied for control of tilting motions.

SUMMARY OF THE INVENTION

It is therefore an object of the present invention to provide a method and apparatus for controlling a magnetic bearing device which enables stable control of a magnetic bearing device, even at high rotational frequencies and/or in presence of disturbances resulting from effects superposed to a pure rigid body behavior.

This object is achieved by a method according to claim 1 and controller according to claim 5.

The method according to the present invention relates to controlling a magnetic bearing device, in which a rotor comprising a shaft is supported magnetically for rotation about a device axis (referred to as the z axis). The bearing device comprises a plurality of electromagnetic actuators for exerting radial forces on the shaft and a plurality of sensors for detecting radial displacements of the shaft. The sensors provide sensor signals. The method comprises the following steps:

from the sensor signals, deriving at least two tilt displacement signals, each signal corresponding to a tilt displacement of the shaft in a predetermined direction;

from the tilt displacement signals, deriving one or more first tilt control signals; and transforming the first tilt control signals for deriving actuator control signals for driving the electromagnetic actuators.

According to the present invention, the step of deriving first tilt control signals comprises applying a filter for a first predetermined sense of rotation of the tilt vector around the device axis to the tilt displacement signals. In other words, the step of deriving first tilt control signals comprises applying a filter for a first predetermined circular polarization to the tilt displacement signals.

The term "circular polarization" is to be understood as a term defining a predetermined phase relationship between signals. Two (or more) approximately periodic signals have a certain circular polarization if the signals have the same amplitude and waveform, but are shifted by a certain fixed phase angle with respect to each other. The phase angle depends on the arrangement of the sources of the signals. If the signals derive from two sensors in orthogonal directions, the phase angle which defines a circular polarization is either +90° (positive circular polarization) or −90° (negative circular polarization). Any set of signals can mathematically be separated into a component with positive and a component with negative circular polarization, as is well known from the field of wave optics. By the way of example, if only one of two signals is different from zero and periodic in time, then this may be called a linear polarization and corresponds to a superposition of two components with equal amplitude and opposite circular polarizations.

Thus, according to the present invention, tilt displacements are discriminated by the sense of rotation of the tilt vector about the device axis or, equivalently, by the circular polarization of the corresponding tilt displacement signals. If more than one mode is present, with different senses of rotation of the tilt vector, only those modes are filtered out and used for control which have the predetermined sense of rotation of the tilt vector. This permits to distinguish, e.g., between precession (for which the sense of rotation of the tilt vector is opposite to the rotation of the rotor about the rotor axis) and nutation (for which the sense of rotation of the tilt vector is the same as the rotation of the rotor about its axis), without having to discriminate these modes by their frequencies. More generally, this permits to discriminate between tilting modes generated by different physical effects for which the senses of rotation of the tilt vector around the device axis are different, even if their frequencies are similar or identical. Specifically, it permits to discriminate between a nutation mode on the one hand and modes resulting from, e.g., blade vibrations or bending motions of the rotor shaft on the other hand, based on the different senses of rotation of the tilt vector around the device axis for such modes, even if the modes have similar or identical frequencies.

The filter for the predetermined sense of rotation (circular polarization) suppresses output signals (first tilt control signals) for input signals (tilt displacement signals) having the opposite ("wrong") sense of rotation (circular polarization). Application of the filter thus means that the first tilt control signals are substantially different from zero only for tilt displacement signals having a component which corresponds to tilt displacements with a tilt vector rotating about the device axis with the first predetermined sense of rotation.

The suppression is preferably better than 10 dB, more preferably better than 20 dB. Suppression factors of better than 26 dB or even 34 dB may be advantageous. The steady-state rms amplitude of an output signal for an input signal with the "wrong" circular polarization is thus preferably smaller than approximately 30%, more preferably 10% of the of the steady-state output rms amplitudes for an input signal with the same constant input rms amplitude and same frequency but with the predetermined ("correct") circular polarization. A ratio of smaller than 5%, more preferably smaller than 2% is advantageous. This ratio should be measured for an input signal having a single frequency, where the frequency is chosen such that the tilt control signals are at a maximum for the predetermined circular polarization.

Preferably, two real tilt displacement signals are provided, each signal corresponding to a tilt displacement in one of two perpendicular directions. However, more than two real tilt displacement signals can be provided, e.g. three, four, five or six, depending on the arrangements of sensors employed. As long as at least two tilt displacement signals are provided, the sense of rotation of the tilt vector can uniquely be determined by the phase relationship between any number of (generally approximately periodic) tilt displacement signals.

Advantageously, the step of deriving first tilt control signals may comprise applying a combined filter for the first predetermined sense of rotation (circular polarization) and for a predetermined frequency to the tilt displacement signals. In this way, only a predetermined mode characterized by its frequency and sense of rotation (or, in other words, circular polarization) is controlled.

The predetermined frequency is preferably a frequency of an eigenmode of the rotor. Eigenmodes include the rigid-body eigenmodes nutation and precession as well as non-rigid modes such as bending modes. Rotation and rotation-synchronous disturbances such as unbalance disturbances are not considered eigenmodes.

Often, the mode to be damped by the present control unit, including most eigenmodes, will depend in a know manner upon the rotation frequency of the rotor. Therefore, it is possible to "tune" the filter to any desired mode. To this end, the method preferably comprises the steps of determining a rotation frequency of the rotor;

depending on said frequency of rotation, calculating said predetermined frequency; and setting a center frequency of said combined filter to said predetermined frequency.

Advantageously, the step of deriving first tilt control signals may additionally comprise a cross-coupling step. This step advantageously comprises: scaling a first tilt displacement signal and adding it to a second tilt displacement signal for obtaining a transformed second tilt displacement signal; and scaling the second tilt displacement signal and adding it to the first tilt displacement signal for obtaining a transformed first tilt displacement signal. The scaling can be with any real factor, including negative factors. Preferably, the scaling factor for the first and second tilt displacement signals have opposite signs, and most preferably, they have the same absolute value and opposite sign. Then the cross-coupling can be understood as an overall scaling of the tilt displacement signals and a phase change (rotation of coordinates). This enables the adjustment of the correct phase of the tilt control signals. This can readily be generalized to providing cross couplings of three or more tilt displacement signals. The cross-coupling then advantageously involves multiplication of a quadratic rotation matrix (whose dimension is the number of tilt displacement signals) with a column vector containing the tilt displacement signals.

Alternatively or additionally, a cross-coupling step may be applied to the tilt control signals instead of the tilt displacement signals. Then the step advantageously comprises: scaling a first tilt control signal and adding it to a second tilt control signal for obtaining a transformed second tilt control signal; and scaling the second tilt control signal and adding it to the first tilt control signal for obtaining a transformed first tilt control signal. As above, the scaling can be with any real factor, including negative factors, and the scaling factor for the first and second tilt displacement signals may advantageously have opposite signs, and most preferably, they may have the same absolute value and opposite sign. In this case, the cross-coupling can be understood as an overall scaling of the tilt control signals and a phase change (rotation of coordinates). As for a cross-coupling of the tilt displacement signals, again, this cross-coupling of tilt control signals enables the adjustment of the correct phase of the resulting output signals. Generalization to more than two tilt control signals is of course again possible, as sketched above.

The method can be readily extended for controlling two or more modes with the same or different circular polarizations independently. For this, the method may additionally comprise the following steps:

from the tilt displacement signals, deriving second tilt control signals which are substantially different from zero only for tilt displacement signals having a component which corresponds to tilt displacements with a tilt vector rotating about the device axis with a second predetermined sense of rotation, specifically, a sense of rotation opposite to the first predetermined sense of rotation (in other words, deriving second tilt control signals by applying a filter for a second circular polarization, specifically, a circular polarization opposite to the first circular polarization, to the tilt displacement signals);

combining the second tilt control signals with the first tilt control signals before deriving the actuator control signals.

Especially if additional means of discriminating different modes are employed, such as additional frequency filtering, the second sense of rotation can be the same as the first sense of rotation.

The controller (device for controlling) according to the present invention is a controller for controlling a magnetic bearing device in which a rotor comprising a shaft is supported magnetically for rotation about a device axis (referred to as z). The controller comprises a tilt control unit for controlling tilting displacements of the rotor shaft. The tilt control unit comprises a first directional control unit having at least two inputs and at least one output. The first directional control unit comprises a filter for a first circular polarization of signals at the inputs. In other words, it is adapted for providing a signal at its at least one output which is substantially different from zero only if signals at the inputs have a component with a predetermined circular polarization. Preferably, the first directional control unit has two inputs. It is further preferred that the first directional control unit has two outputs. However, also three, four, five, six or more inputs and/or outputs are possible, dependent on the arrangement of sensors and actuators.

Advantageously, the first directional control unit may comprise a combined filter for the circular polarization and for the frequency of the input signals.

Preferably, the controller further comprises frequency control means for determining the rotation frequency of the rotor and for controlling the predetermined frequency of the combined filter depending on the rotation frequency. In this manner, the combined filter is readily tuned to the frequency of any desired mode to be damped, provided that the dependence of this frequency on the rotation frequency in known.

In particular, the predetermined frequency may be the frequency of an eigenmode. Then the frequency-control means are preferably adapted to control the predetermined frequency of the combined filter in such a manner that it corresponds to the frequency of a predetermined eigenmode of the rotor. To this end, the frequency-controlling means may comprise a frequency calculating unit which calculates the frequency of the eigenmode from the rotation frequency, e.g., by employing a lookup table in a know manner.

In a preferred embodiment, the first directional control unit comprises a first and a second integrator, each having an input and an output. The output of the second integrator is coupled to the input of the first integrator via a first coupling unit, and the output of the first integrator is coupled to the input of the second integrator via a second coupling unit. The sign of the coupling provided by the first coupling unit is opposite to the sign of the coupling provided by the second coupling unit.

In an alternative embodiment, the combined filter comprises a tracking filter centered around the predetermined frequency. A tracking filter is a unit which transforms a set of input signals into a rotating frame (a coordinate system rotating with the predetermined frequency), applies a low pass filter to the resulting signals, and transforms the filtered signals back into the reference frame.

Preferably, the first directional control unit further comprises a transformation block for implementing cross couplings between a first and a second input of the first directional control unit. The transformation block comprises a first cross-coupling branch for scaling a first signal at the first input and adding the scaled first signal to the signal at the second input to yield a transformed second signal, and a second cross-coupling branch for scaling a second signal at the second input and adding the scaled second signal to the first signal to yield a transformed first signal. The scaling can be with an arbitrary real number, including negative numbers. Advantageously, the first cross-coupling branch effects scaling with a sign opposite to the scaling effected by the second cross-coupling branch. Preferably, the scalings effected by both branches have the same absolute values and opposite signs. This enables any desired phase rotation of the input signals for achieving optimum damping of the mode to be controlled by the directional control unit.

This scheme is most appropriate if the first directional control unit has only two inputs. However, the transformation block can readily be generalized to the case where three or more tilt displacement signals are provided. Then a number of cross-coupling branches is provided which implement multiplication of a quadratic rotation matrix whose dimension is the number of tilt displacement signals with a column vector containing the tilt displacement signals.

Alternatively or additionally, a transformation block may be provided at the down-stream side of the directional control unit, implementing cross couplings between signals at the outputs of the directional control unit instead of implementing cross couplings between signals at the inputs of the directional control unit.

Advantageously, the tilt control unit may further comprise a second directional control unit having a at least two inputs and at least one output, said second directional control unit comprising a filter for a second predetermined circular polarization opposite to the first predetermined circular polarization. In other words, the second directional control unit is adapted for providing signals at the at least one output which are substantially different from zero only if signals at the inputs have a component with a second predetermined circular polarization opposite to the first predetermined circular polarization. This enables independent control of tilting motions with different circular polarizations.

Alternatively or additionally, the tilt control unit may comprise a plurality of directional control units having a first input and a second input and at least one output, each directional control unit comprising a combined filter for a predetermined circular polarization and a predetermined frequency, wherein the predetermined frequency is different for each directional control unit. In this way, several different modes with the same circular polarization can be controlled independently.

The controller according to the present invention is preferably a controller for a bearing device comprising a plurality of electromagnetic actuators for exerting radial forces on the shaft and a plurality of sensors for detecting radial displacements of the shaft and providing sensor signals. It then advantageously comprises a first transformation unit for transforming the sensor signals to yield at least two tilt displacement signals, each tilt displacement signal corresponding to a tilt of the shaft in a predetermined direction. The tilt displacement signals are fed to the inputs of the tilt control unit. The tilt control unit has at least two outputs providing tilt control signals, and the controller further comprises a second transformation unit for transforming the tilt control signals to actuator control signals for driving the electromagnetic actuators.

The invention further provides a magnetic bearing device according to claim 11 and a turbo-molecular pump, comprising a magnetic bearing device and a rotor with a plurality of rotor blades, according to claim 12.

BRIEF DESCRIPTION OF THE DRAWINGS

Advantageous embodiments of the invention will be described in more detail with reference to the drawings, in which.

DETAILED DESCRIPTION OF THE INVENTION

Figure 1:
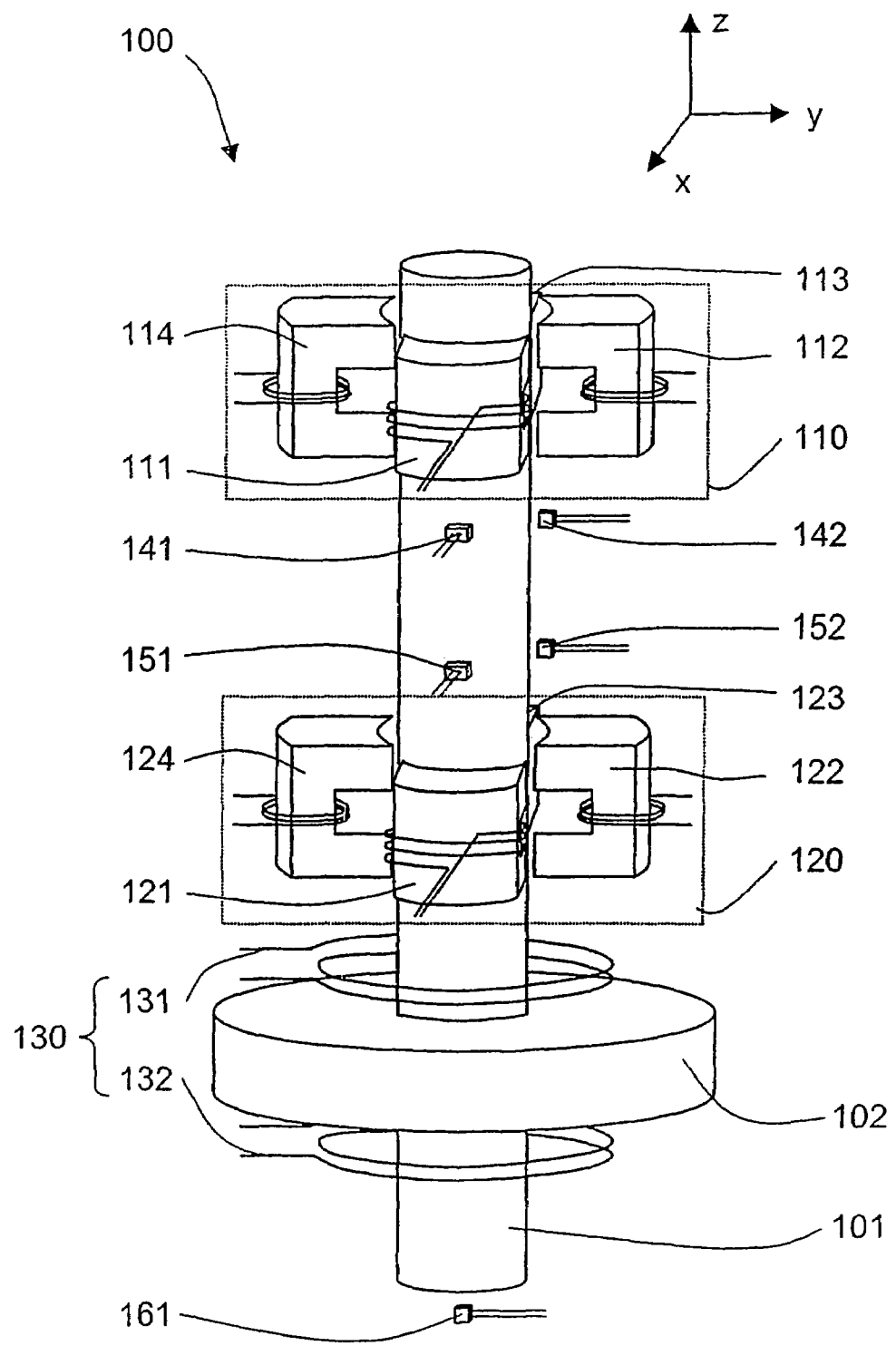
FIG. 1 is a highly schematic side view of a rotor suspended in a magnetic bearing device.

First, some features of a magnetic bearing device will be explained by way of example with reference to FIG. 1. This figure shows, in a highly schematic manner, a rotor shaft 101 suspended in a magnetic bearing device 100 for rotation about the z direction. Attached to the rotor shaft may be a rotor body carrying, e.g. rotor blades for use in a TMP, which is not shown in FIG. 1. The bearing device comprises a first (upper) radial bearing unit 110, a second (lower) radial bearing unit 120, and an axial (thrust) bearing unit 130 cooperating with a disk 102 attached to the shaft 101. The upper radial bearing unit 110 comprises four actuators 111, 112, 113, and 114 for exerting forces on an upper region of the shaft 101 in the +x, +y, −x, and −y directions, respectively, the x and y directions being mutually orthogonal and perpendicular to the z direction. Likewise, the lower radial bearing unit 120 comprises four actuators 121, 122, 123, and 124 for exerting forces on a lower region of the shaft 101 in the +x, +y, −x, and −y directions, respectively. Each of the actuators in the radial bearing units consists of an electromagnet comprising a coil wound on a pole shoe or yoke. Also the axial bearing unit comprises two electromagnetic actuators 131 and 132, symbolized in a simplifying manner just by coils in FIG. 1.

The rotor with shaft 101 suspended in the magnetic bearing device 100 can, to a first approximation, be treated as a rigid rotor with six degrees of freedom (DOFs). One DOF is the rotation about the z axis. This DOF is generally driven by an electromotor which, for simplicity, is not shown in FIG. 1. The other five DOFs can be separated as translations in the x, y and z direction and tilting motions around the x and y axes (in the y-z and x-z planes). These can be controlled as follows: Sensors 141, 142 determine displacements of the upper region of shaft 101 in the ±x and ±y directions, respectively. Likewise, sensors 151, 152 determine displacements of the lower region of the shaft 101 in the ±x and ±y directions, respectively. A sensor 161 determines displacements in the z direction. The signals from these sensors are fed to a controller, which derives driving signals for the actuators from the sensor signals by known means. The same scheme can be generalized to a situation with more than five sensors.

It is to be understood that FIG. 1 is only provided by way of example and illustration. The invention is in no way limited to a magnetic bearing device as shown in FIG. 1. For example, each radial bearing unit may comprise a number of actuators different from four, the arrangement of the radial bearing units along the device axis may be different, or axial control may be achieved without the presence of distinct axial bearings of the type shown.

The rotor suspended in such a magnetic bearing device can to a first approximation be treated as a rigid top, with nutation and precession being two modes of the tilting displacements. For high rotor frequencies, the nutation frequency is approximately proportional to the rotor frequency, and the sense of the rotation of the tilt vector about the device axis in the nutation mode is the same as the sense of rotation of the rotor about the rotor axis. Mathematically speaking, the Euclidean scalar product of the angular velocity vector of nutation about the z axis and the angular velocity vector of rotation about the rotor axis is always positive. Defining the sign of a frequency by the sign of the z component of the corresponding angular velocity vector, the sign of the nutation frequency is the same as the sign of the rotation frequency. In the following, any mode for which the tilt vector has the same sense of rotation around the device axis as the rotation of the rotor about the rotor axis will be called a "forward mode". On the other hand, any mode for which the tilt vector rotates around the device axis in a sense which is opposite to the sense of rotation of the rotor about the rotor axis will be called a "backward mode". Precession is a backward mode. For high rotation frequencies, the frequency of precession is approximately proportional to the inverse of the rotation frequency, i.e., it decreases towards zero with increasing rotation frequency.

However, often not only rigid-body modes are important, but also other modes can be excited. The characteristics of these modes depend on the type and design of the rotor and thus on the specific application of the magnetic bearing device. For example, if a magnetic bearing device is used for suspending the rotor of a TMP, in addition to the rigid-body modes, also bending modes of the rotor shaft and a multitude of vibrational modes of the rotor blades may be present. Often these modes are not "local" modes which only involve vibration of a well-defined part of the rotor, but, e.g., a blade vibration mode or a bending mode of the rotor shaft may also involve a slight tilting component of the rotor shaft. Thus the additional modes can contribute significantly to the sensor signals. Due to a dynamic coupling of the additional modes to the rotation of the rotor, the eigenfrequencies of the additional modes will also depend on the rotation frequency.

Figure 2:
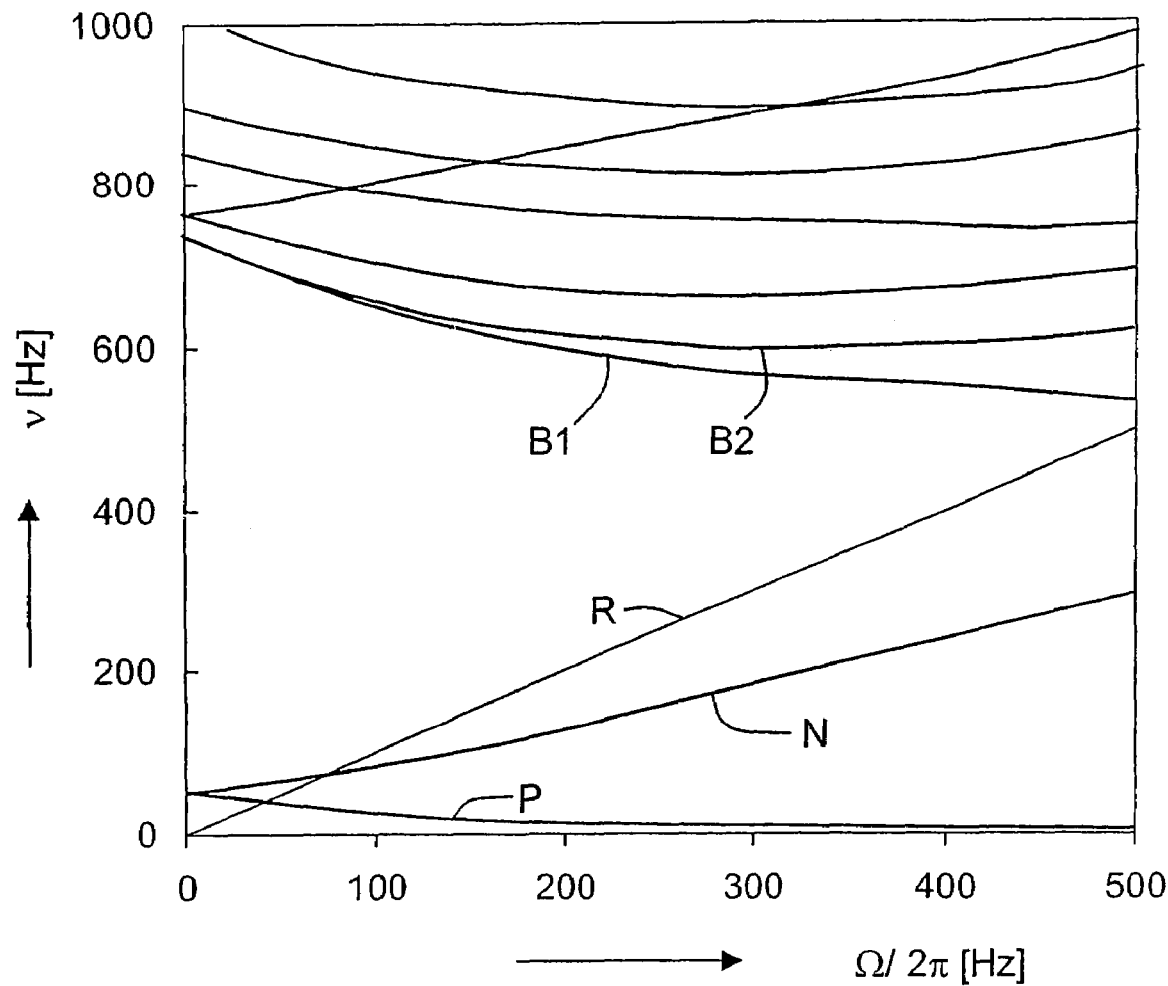
FIG. 2 is a schematic diagram showing the rotor-speed dependences of rotor eigenmodes.

Examples of some modes present in a TMP whose rotor is suspended in a magnetic bearing device are schematically depicted in FIG. 2. In this diagram, the variation of the eigenfrequencies v of several selected modes with varying rotation frequency $\Omega/2\pi$ is shown schematically. Apart from the rotation R, two rigid-body modes are shown: the nutation N and the precession P. Generally, the nutation frequency is approximately proportional to the rotation frequency. The factor of proportionality is given by the ratio of the moments of inertia around the z direction and the x-y direction. For an elongated rotor, this ratio is smaller than one, and at elevated rotation frequencies the nutation frequency will be smaller than the rotation frequency. For a disk-shaped rotor, the ratio will be between 1 and 2, and the nutation frequency can be up to twice the rotation frequency. The present invention is equally applicable for both kinds of rotors. With rising frequency, the character of the nutation mode attains significant bending admixtures. This leads to deviations from the linear relationship between nutation frequency and rotation frequency. Generally, the presence of bending admixtures will lead to a slight, but appreciable lowering of the nutation frequency. These deviations become strongest in the vicinity of a frequency crossing with a bending eigenmode.

The precession frequency is always smaller than the nutation frequency and, at high rotation frequencies, approximately inversely proportional to the rotation frequency. Translational motions are not shown in FIG. 2.

In addition to the rigid-body modes, several modes are present whose eigenfrequencies are much higher than the eigenfrequencies of the rigid-body modes as long as the rotation frequency is low. In the present example, the lowest-frequency modes of this kind are two modes B1 and B2 involving mainly blade vibrations. In the following, any mode dominated by blade vibrations will be called a blade mode for simplicity. Other important modes are modes dominated by the bending vibration of the rotor shaft. Such modes will be called bending modes for simplicity. Several modes have been omitted from FIG. 2 for clarity. Specifically, only one of the modes whose eigenfrequencies rise with rising rotation frequency $\Omega/2\pi$ already at low rotation frequencies is shown.

In the prior art, such modes have usually been neglected. This might be appropriate as long as the eigenfrequencies of these modes are high compared to the frequencies of the rigid-body modes. This is normally the case at low rotation frequencies. However, as can be seen in FIG. 2, in applications of magnetic bearing devices with high rotation frequencies, the eigenfrequencies of these additional modes can become comparable to the rotation frequency (here, at about 500 Hz) and may become as low as or even lower than the nutation frequency. If the eigenfrequency of an additional (blade or bending) mode comes into the vicinity of the rotational speed or the nutation frequency, control of the device with prior-art control schemes may become difficult, and this can cause instabilities with possibly catastrophic consequences.

This is especially true for modern applications of magnetic bearing devices in TMPs. In such applications, it is often a design goal to keep the rotor short in order to increase the eigenfrequencies of bending modes of the rotor shaft. This, however, leads to a highly gyroscopic rotor whose moments of inertia around the radial directions are only slightly larger than the moment of inertia around the rotor axis. A higher ratio of axial to radial moments of inertia leads to a higher nutation frequency, and control of nutation becomes more difficult. At the same time, such modern TMP devices often feature long and thin blades that tend to have comparably low vibration frequencies, an effect which adds to the nutation control problem. This problem would be even compounded for a disk-like rotor, for which the moment of inertia around the radial directions are smaller than the moment of inertia around the axial direction, and the nutation frequency is higher than the rotation frequency.

The reason for the difficulties of control with prior-art schemes is that usually a blade or bending mode with the same frequency as a given rigid-body mode will not be distinguished from the rigid-body mode itself. If such a mode is excited in the rotor, it also generates sensor signals at the controller input. The controller, which is adapted to controlling the rigid-body modes, will not recognize these sensor signals as arising from an additional mode and will try to minimize the signals as if they arose from a rigid-body mode. This might, however, be totally inappropriate and might even lead to an amplification of the additional mode.

The present invention improves control by utilizing that, like the rigid-body modes, the additional modes can also be classified by their sense of rotation. This is a consequence of the approximate axial symmetry of the rotor. Therefore, each additional mode is either a forward or a backward mode. The eigenfrequencies of the forward modes generally rise with increasing rotation frequency, while the eigenfrequencies of the backward modes generally decrease with increasing rotation frequency. Therefore, the additional modes with the lowest frequencies at high rotation frequencies are usually backward modes, and it is these modes which may have similar frequencies as the nutation.

This has at least two consequences: the first is that the forward nutation mode and the backward additional modes are orthogonal by way of their different circular polarizations, i.e., they keep being separate modes even at a frequency crossing. The second is that the forward nutation mode can in principle be distinguished from the backward additional modes by their different circular polarizations. Therefore, the forward nutation mode can be controlled separately, without influences from the backward blade modes. Such control is achieved in the present invention.

Figure 3:
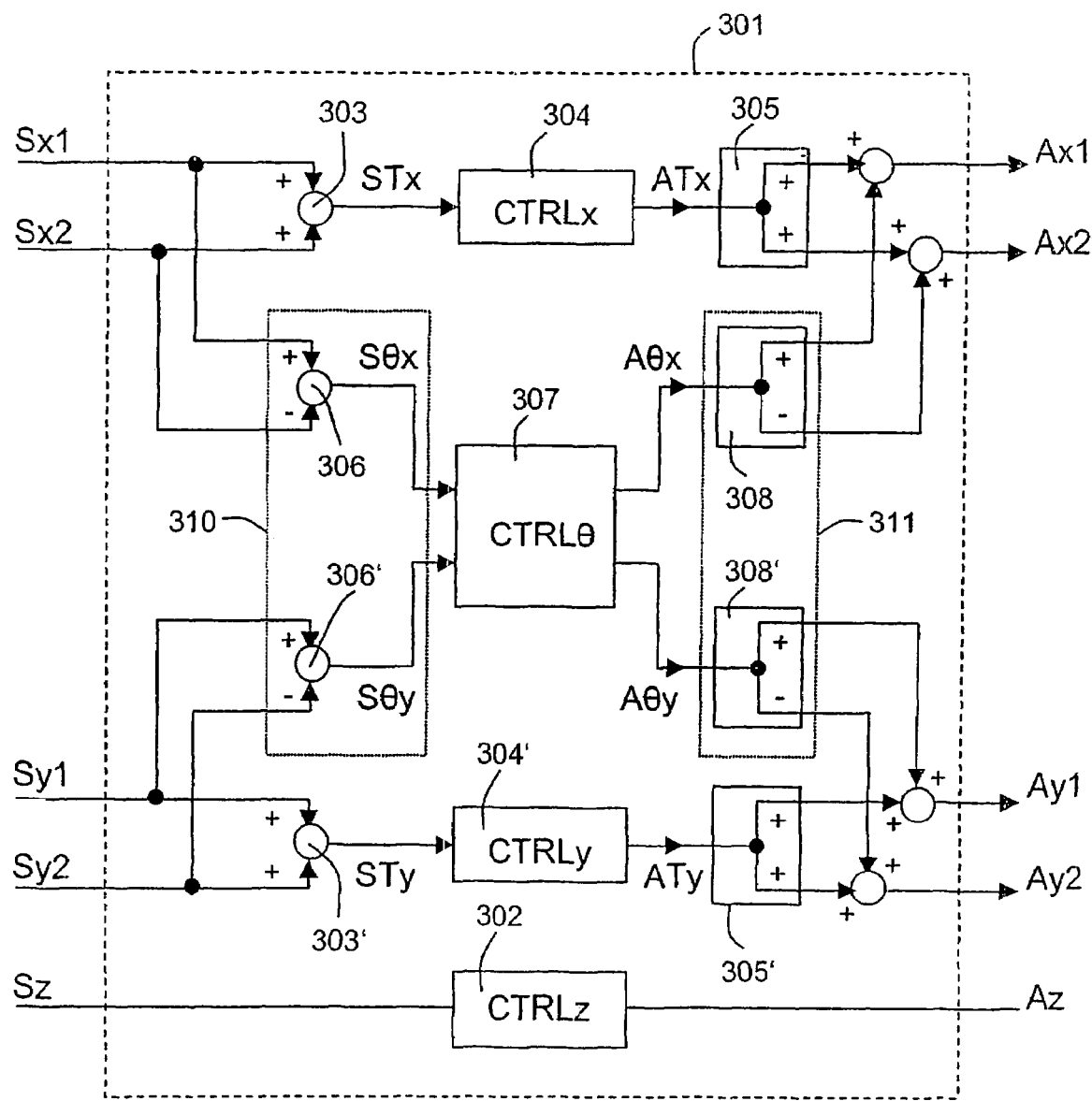
FIG. 3 is a block diagram of a general control scheme.

In order to make the present invention better understood, reference is now made to FIG. 3, illustrating an advantageous embodiment of the present invention. In this figure, a controller 301 for a magnetic bearing device is schematically depicted. The controller has five inputs for input signals Sx1, Sx2, Sy1, Sy2, Sz, and five outputs providing output signals Ax1, Ax2, Ay1, Ay2, and Az. Each input signal is derived from one or more sensors in the magnetic bearing device. In the simplest case, input signal Sx1 is received from a single radial displacement sensor measuring the displacement of a lower portion of the rotor shaft in the x direction. If more than one sensor is present for measuring displacements of the same shaft portion in the (positive or negative) x direction, these signals are appropriately combined by forming sums or differences before being fed to the controller input. Usually, two such sensors are present for each direction, as explained above.

Likewise, input signal Sx2 corresponds to a displacement of an upper portion of the shaft in the x direction. Similarly, the input signals Sy1 and Sy2 indicate displacements of a lower or an upper portion of the shaft, respectively, in the y direction. Finally, the input signal Sz indicates a displacement in the z direction.

In the controller 301, the signal Sz is fed to a control unit 302, indicated by CTRLz, providing a control signal Az at the output. This serves to control the displacements in the z direction. Suitable control units for this purpose, such as proportional, proportional-differential (PD) or proportional-integral-differential (PID) controllers, in combination with filters for signal attenuation at high frequencies, are well known in the art.

The signals Sx1 and Sx2 are added in an adder 303, possibly after appropriate weighting, to yield a signal STx corresponding to a center-of-mass translation of the rotor in the x direction, as is well known in the art. Likewise, signals Sy1 and Sy2 are added to yield a signal STy. Each of the translational signals STx and STy is fed to an independent control unit 304, 304', indicated by CTRLx and CTRLy, respectively, yielding output signals ATx and ATy. Again, suitable control units are known in the art. Each of these signals is split up in a splitter 305, 305' and contributes, possibly after weighting, to control signals Ax1, Ax2 and Ay1, Ay2, respectively. In this way radial translational motions in the x and y directions are controlled independently by one control unit each.

In an adder 306, signals Sx1 and Sx2 are subtracted, possibly after appropriate weighting, to yield a signal $S\theta x$ corresponding to a tilt in the x direction. A similar difference is formed from the input signals Sy1 and Sy2 in an adder 306', yielding a corresponding signal $S\theta y$. The tilt displacement signals $S\theta x$ and $S\theta y$ are fed to a tilt control unit 307 with two inputs and two outputs. This unit generates at its outputs tilt control signals $A\theta x$ and $A\theta y$. Each of these signals is then split up into two signals with different signs in a splitter 308 and contributes, possibly after weighting, to the actuator control signals Ax1, Ax2 and Ay1, Ay2, respectively.

The adders 306, 306' may together be regarded more generally as constituting a first transformation unit 310, which transforms the input signals Sx1, Sx2, Sy1 and Sy2 into tilt displacement signals $S\theta x$ and $S\theta y$. Likewise, the splitters 308, 308' may together be regarded as constituting a second transformation unit 311, which transforms the tilt control signals $A\theta x$ and $A\theta y$ into actuator control signals Ax1 Ax2, Ay1 and Ay2.

Thus, in general terms control of the tilting motions is achieved by first transforming the sensor signals Sx1, Sx2, Sy1, Sy2 to yield tilt displacement signals $S\theta x$, $S\theta y$. These correspond to tilting displacements of the shaft in two predetermined, here orthogonal, directions x, y. Then, from the tilt displacement signals $S\theta x$, $S\theta y$, tilt control signals $A\theta x$ and $A\theta y$ are derived. These are then transformed, the transformation yielding actuator control signals Ax1, Ax2, Ay1, Ay2 for driving the electromagnetic actuators.

Figure 4:
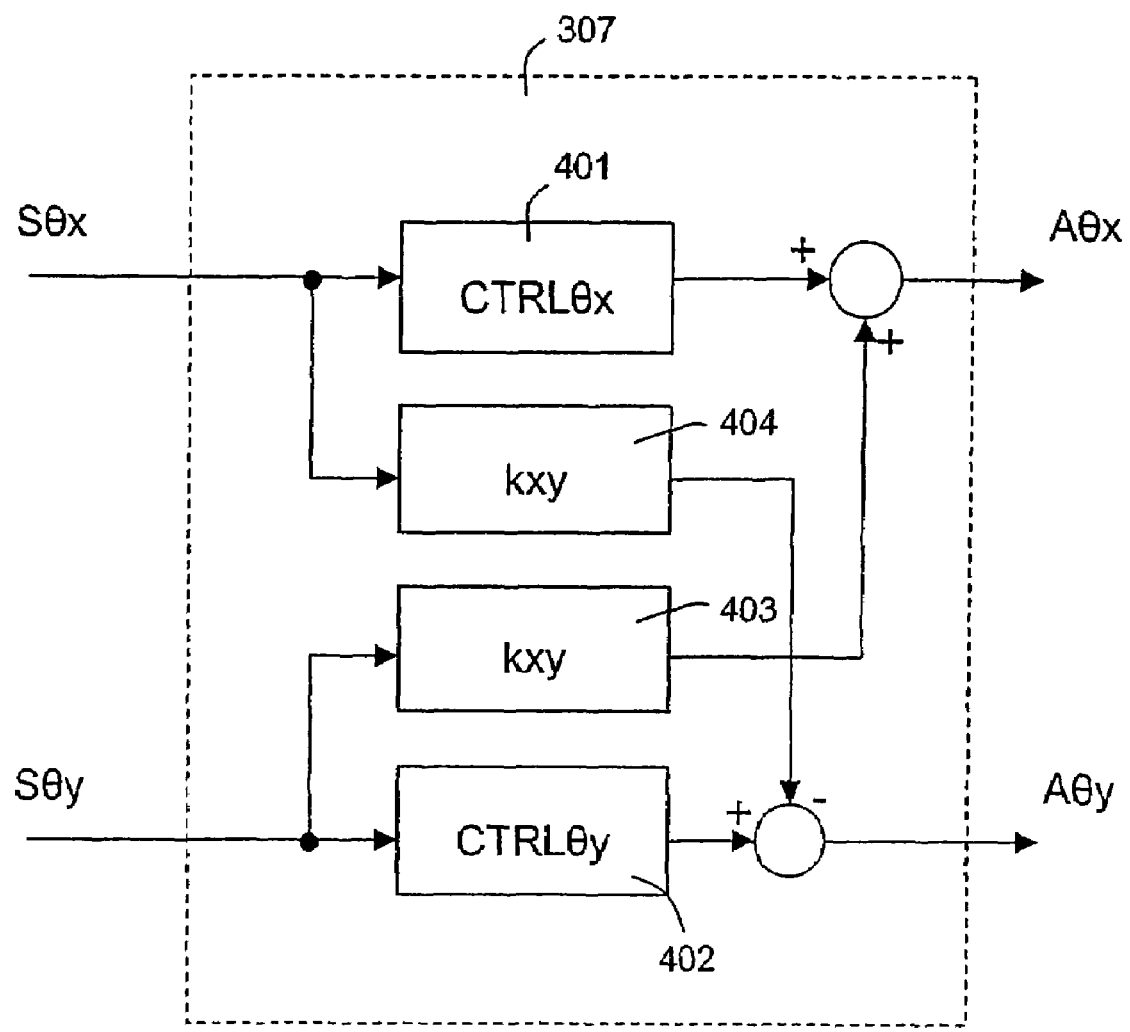
FIG. 4 is a block diagram of a control unit according to the prior art.

In some prior-art schemes, the tilt control unit 307 would consist of two independent control units for tilting motions in the x and y direction, or it might implement a cross-coupling scheme. This is illustrated in FIG. 4, which shows a schematic tilt control unit 307 according to the prior art. The unit comprises a first control unit 401, indicated by CTRL$\theta$x, and a second control unit 402, indicated by CTRL$\theta$y. A first cross-coupling unit 403 feeds part of the input signal of the second control unit 402 to the output of the first control unit 401. The second cross-coupling unit 404 feeds part of the input signal of the first control unit 401 to the output of the second control unit 402, with the same coefficient indicated by kxy, however with opposite sign. If the cross-coupling units are left away, independent control of the tilting motions in the x and y directions results. By providing cross-couplings, a tilt in the x direction also leads to a control signal in the y direction and vice versa. Mathematically, this corresponds to a rotation of the coordinate system by a certain amount, the signs of the cross couplings determining the direction of rotation. One sign is appropriate for controlling a forward mode, while the other sign is appropriate for controlling a backward mode. If, however, the tilt displacement signals $S\theta x$, $S\theta y$ arise from a backward mode while the cross-coupling scheme is adapted for controlling a forward mode, amplification instead of damping of the backward mode may result. This explains why in general such cross-coupling schemes fail to properly control (forward) nutation in the vicinity of a frequency crossing with a (backward) blade mode. This behavior stays the same even if frequency filters are employed in the cross-coupling branches, as has been proposed in the prior art, since, in the vicinity of a frequency crossing, the frequencies of the nutation mode and the blade mode are similar by definition.

Figure 5:
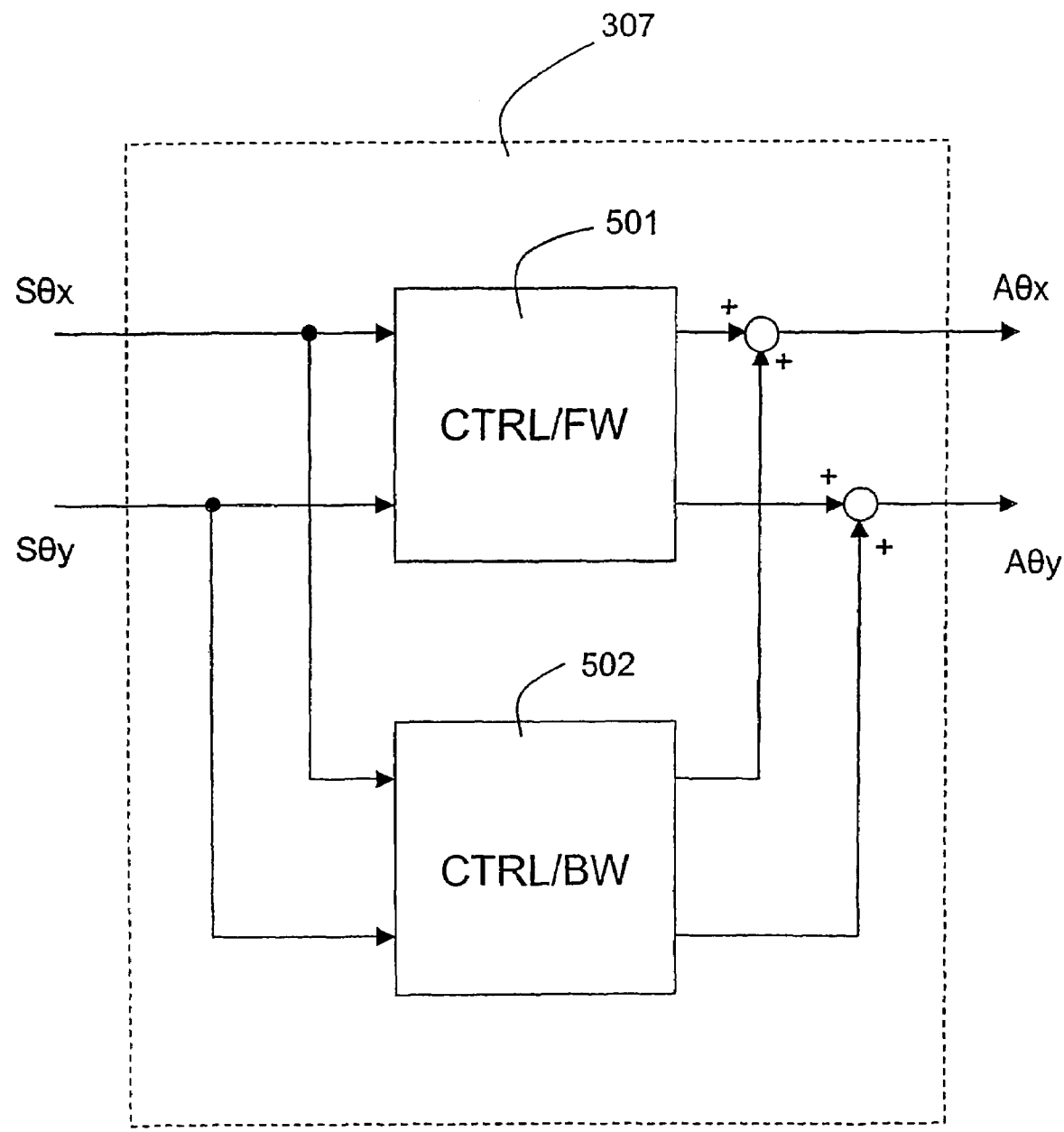
FIG. 5 is a block diagram of a control unit according to the present invention.

Instead, the present invention proposes to provide independent control for forward and backward modes, as illustrated in FIG. 5. Here, the tilt control unit 307 comprises two directional control units 501 and 502. The first directional control unit 501, indicated by CTRL/FW, serves for controlling only forward modes, i.e., output signals of this unit are only insubstantially different from zero if the input signals correspond to a backward mode. In other words, output signals from input signals corresponding to any backward mode are suppressed compared to output signals from input signals corresponding to a forward mode. The first directional control unit 501 therefore acts as a filter for one specific circular polarization. Analogously, the second directional control unit 502, indicated by CTRL/BW, serves for controlling only backward modes, i.e., the output signals of this unit are only insubstantially different from zero if the input signals correspond to a forward mode. In real-life applications, the input signals will have both forward and backward components. Then each component is controlled separately in the appropriate directional control unit.

In general terms, what is important is that the suppression of the undesired component by the directional control unit is at least as good as the calibration of the sensors. If the sensors are miscalibrated, e.g., if the sensors in the x and y directions have different gains, then a circular forward motion of the displaced rotor shaft (mathematically, a pure rotation of the tilt vector around the z axis with constant length) appears at the inputs of the control unit as an ellipse. An elliptic forward motion, on the other hand, can be understood as a superposition of a circular forward motion and a circular backward motion with smaller amplitude. In this way, sensor miscalibration can lead to a control signal by the backward control unit even when there is no backward motion, even for a backward control unit with perfect forward suppression. Of course, such miscalibrations should be minimized.

Figure 6:
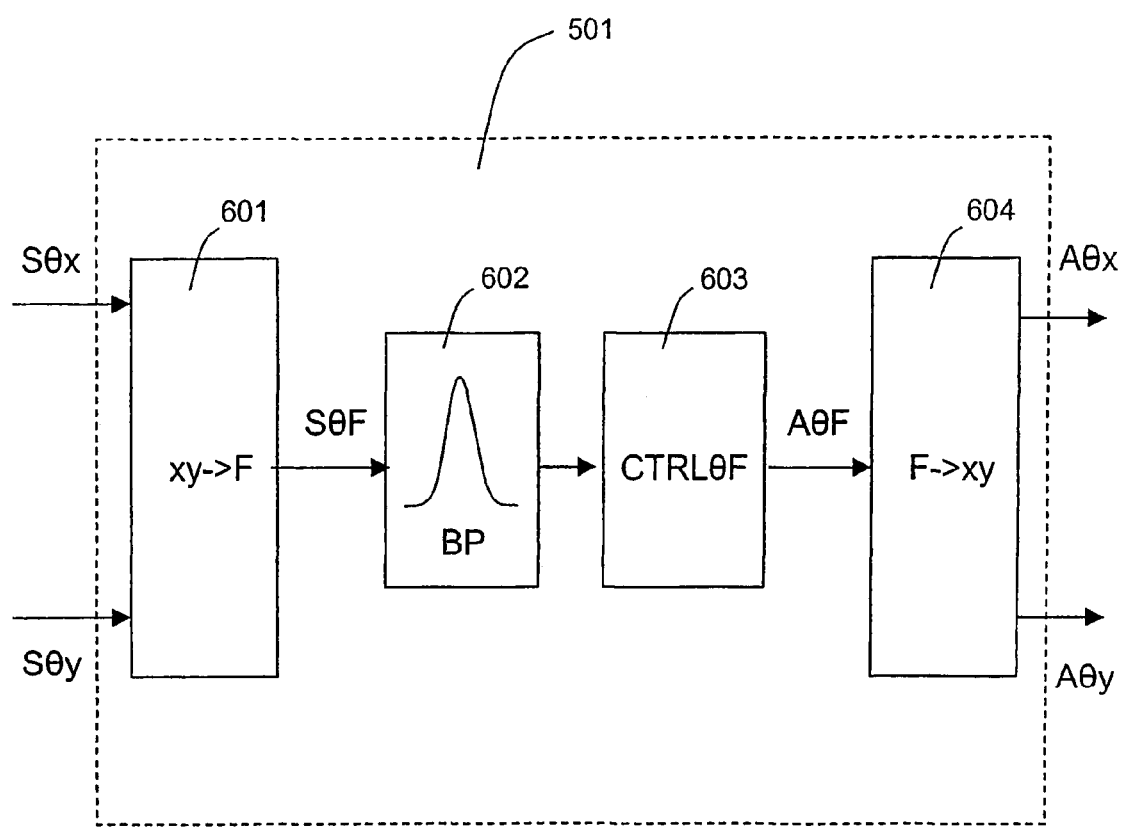
FIG. 6 is a block diagram of the control scheme for the nutation mode according to the present invention.

The control scheme in the forward directional control unit 501 may conceptually be separated into four components as shown in FIG. 6, even though this separation may be somewhat artificial, and the directional control unit may not be separable like this at all. Conceptually, the tilt displacement signals $S\theta x$, $S\theta y$ are first transformed in a transformation unit 601, indicated by xy->F, to yield only the forward component $S\theta F$ of the input signal. This unit can be understood as a circular polarization filter, similar to such a filter in optics, which allows only light with a single circular polarization to pass. The forward component is optionally passed through a bandpass filter 602, whose center frequency is the nutation frequency. As the nutation frequency depends on the rotation frequency, the bandpass is advantageously adapted to receive information about the rotation frequency and shift its center frequency accordingly upon changes of rotation frequency. The bandpass removes noise outside the desired frequency band as well as signals arising from forward modes outside the frequency region of the nutation. The bandpass output is then fed to a control unit 603, indicated by $CTRL\theta F$, for deriving a control signal $A\theta F$. This signal is finally transformed back in another transformation unit 604 to yield tilt control signals $A\theta x$, $A\theta y$.

Figure 7:
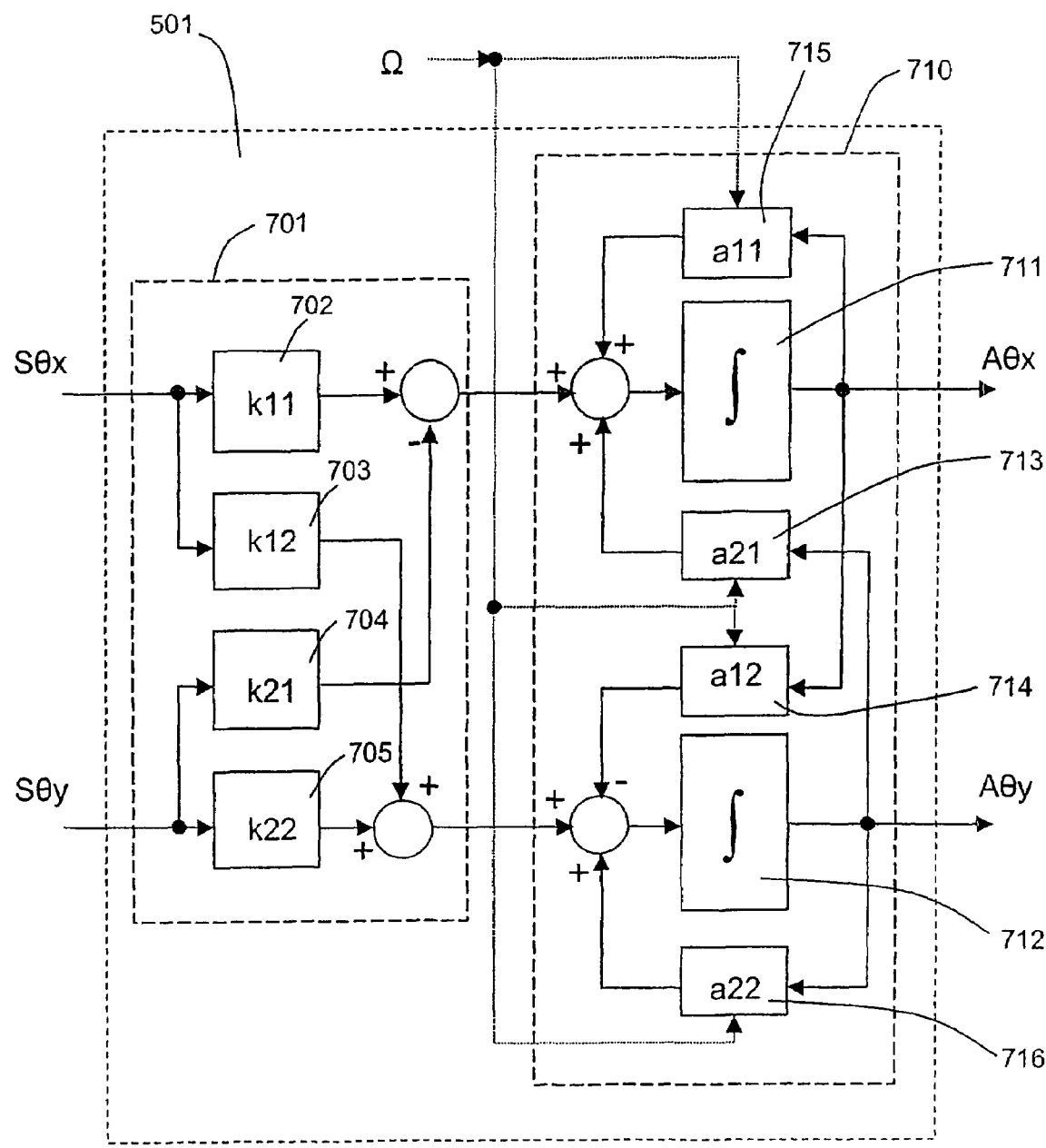
FIG. 7 is a block diagram of a control unit according to a preferred embodiment of the present invention.

FIG. 7 shows an advantageous embodiment of a forward directional control unit 501 according to the present invention. The unit comprises two independent blocks 701 and 710. The second block 710 will be described first. This block comprises a first integrator 711 and a second integrator 712. A first coupling unit scales the output of the second integrator 712 by a factor a21 and feeds it to the input of the first integrator 711. A second coupling unit 714 scales the output of the first integrator 711 by a factor a12 and feeds it to the input of the second integrator 712, however with a different sign. Feedback units 715 and 716 scale the output of each integrator by a factor a11 and a22, respectively, and feed this back into its own input to provide for damping of the controller itself.

The mode of operation of the block 710 will now be described. The closed loop of the two integrators 711, 712 with the two coupling units 713, 714 in a cross-feedback scheme constitutes a two-directional oscillator system. The frequency of this oscillator is adjusted by the scaling applied to the signals in the coupling units 713, 714. The oscillator maintains a fixed phase difference of 90° between the two output signals $A\theta x$ and $A\theta y$ of the directional control unit 501, with a predetermined sign of this phase difference. The oscillator is damped by the feedback provided through the feedback units 715, 716. Without excitation at the inputs of block 710, the oscillator will therefore not oscillate. Input signals at the two inputs of block 710 will excite the oscillator only if the input signals have a component with approximately the same frequency as the predetermined oscillator frequency and the same phase relationship as the oscillator outputs. In all other cases, an input signal will not lead to a substantial output signal at the oscillator outputs. Therefore, output signals arising from any input signals with the wrong phase relationship, i.e., with the wrong sense of rotation of the corresponding tilt displacements, that is, wrong circular polarization, are suppressed. Also suppressed are output signals arising from input signals with a frequency different from the predetermined frequency of the oscillator. Thus the block 710 serves both as a circular polarization filter and a (narrow-band) frequency filter in a single unit.

In other words, the block 710 acts like a sign-dependent (i.e, rotation-direction-dependent or polarization-dependent) bandpass filter. A sign-dependent band pass filter might be defined as a unit with two inputs (which might be called "real" and "imaginary") and two outputs which lets the input signals pass to the outputs only for input signals within a certain frequency band around the bandpass center frequency, and only if the input signals additionally have a certain phase relationship between them that defines a predetermined sense of rotation (circular polarization), which may be taken as the sign of the frequency.

The coupling units 713, 714 and the feedback units 715, 716 receive information about the rotation frequency $\Omega/2\pi$ of the rotor. Based on such frequency information, they adjust the scaling factors a12, a21 to match the oscillator frequency to the desired frequency $\omega$, here the nutation frequency, and they may adjust the damping factors a11, a22 to provide for frequency-dependent optimal dampings.

Next, the block 701 will be described. The block 701 implements a standard cross-coupling scheme. In a scaling unit 702, the input signal $S\theta x$ is scaled by a factor k11. Likewise, in a scaling unit 705, the input signal $S\theta y$ is scaled by a factor k22 which preferably is equal to the factor k11. In addition, cross coupling units are present which lead to cross couplings with factors k12 and −k21. Preferably, the factors k12 and k21 are again equal. Then the cross-coupling scheme corresponds to a scaling of both input signals by $\sqrt{k11^2+k12^2}$ and a rotation of coordinates by a phase angle $\phi=\arctan(k12/k11)$. The factors k11, k12, k21 and k22 may advantageously depend on the rotation frequency.

The cross coupling scheme of block 701 serves a different purpose than cross-coupling schemes of the prior art. In the prior art, cross couplings would rotate the coordinate system always in the same direction, regardless of the modes detected by the sensors. In contrast, here the cross coupling serves for rotating the coordinate system only for a single, well-defined mode, specified both by its frequency and, importantly, its circular polarization. In the present example, the purpose of the cross couplings is to adjust the optimum phase and amplitude of the subsequent oscillator unit 710. Since forward and backward modes are controlled independently by independent directional control units, the rotation of the coordinate system (i.e., the phase) can be chosen differently for forward and backward modes. In addition, the amplitude and phase can be dependent on the rotation frequency (or, equivalently, on the oscillator frequency, which in turn depends on the rotation frequency). These parameters are adjusted by choosing the factors k11, k12, k21 and k22 accordingly, in dependence on the rotation (or oscillator) frequency. The introduction of cross couplings into the scheme of the present invention is an important further improvement of this scheme.

The control scheme of the present invention can be implemented in analog hardware, digital hardware, or in software. If it is implemented in digital hardware or in software, all input signals to the controller are first digitized by analog-to-digital converters (ADCs). Digital output signals are finally converted to analog control, signals by digital-to-analog converters (DACs). The digital to analog conversion can be performed by other means or omitted, e.g., when using digital pulse width modulation (PWM) to control a switching power amplifier directly to control the current in the electromagnets of the actuators. Preferably, the control is implemented on a digital signal processor (DSP).

In the following, an example will be given. A controller according to FIG. 3 with a tilt control unit according to FIG. 5 was implemented by providing an appropriately programmed DSP which was interfaced with a standard personal computer (PC). Digitized input and output signals were transmitted from the DSP to the PC, which was running the simulation environment Matlab® (The MathWorks, Natick, Mass., U.S.A.) for analysis and visualization. Actual displacement signals were obtained from a TMP with a pumping performance of approximately 3000 liters per second and with a ratio of the axial and radial moments of inertia of approximately 1:1.3 and fed to the inputs of the controller. Control signals at the outputs of the controller were used to drive the actuators of the TMP.

Both the forward and backward directional control units 501 and 502 were implemented as shown in FIG. 7. The forward directional control unit was optimized for controlling the nutation mode, while the backward directional control unit was optimized for controlling the precession mode. Coefficients for the forward directional control unit were as follows (subject to an overall scaling factor and to the overall sign convention):

TABLE 1

| $\Omega/2\pi$[Hz] | 150 | 300 | 400 |
|---|---|---|---|
| k11 | 388 | 1610 | 2764 |
| k12 | 1611 | 2571 | 2812 |
| k21 | 1611 | 2571 | 2812 |
| k22 | 388 | 1610 | 2764 |
| a11 | −2117 | −4979 | −7242 |
| a12 | −9240 | −17098 | −21546 |
| a21 | −9240 | −17098 | −21546 |
| a22 | −2117 | −4979 | −7242 |

Control of the (forward) nutation mode took into account that, at elevated frequencies, the actual value of the nutation frequency is somewhat lower than the value expected in the rigid-body approximation, i.e., that there is a deviation from the linear relationship between rotation frequency and nutation frequency. This was achieved by approximating this relationship by a second-order polynomial with a small negative coefficient for the second-order term. Suppression of output signals arising from input signals which have the frequency of the nutation mode, but which have the wrong (i.e., backward) sense of rotation, was better than 22 dB at all rotation frequencies in this implementation.

Coefficients for the backward directional control unit were chosen independent of the rotation frequency as follows:

TABLE 2

| $\Omega/2\pi$[Hz] | 150 |
|---|---|
| k11 | 16 |
| k12 | 813 |
| k21 | 813 |
| k22 | 16 |
| a11 | −1627 |
| a12 | 0 |
| a21 | 0 |
| a22 | −1627 |

As, in this example, coefficients a12 and a21 of the backward directional control unit were chosen to be zero, actually no directional filtering is applied in this second unit. Instead, a cross-coupling scheme is combined with lowpass filtering for controlling the low-frequency backward precession mode. As no forward modes at a correspondingly low frequency exist, this is sufficient for achieving independent control of the backward precession mode. For controlling backward modes different from the low-frequency precession mode, however, these coefficients would advantageously be chosen different from zero.

Stable control at all rotation frequencies above approximately 150 Hz was achieved with this implementation.

Figure 8:
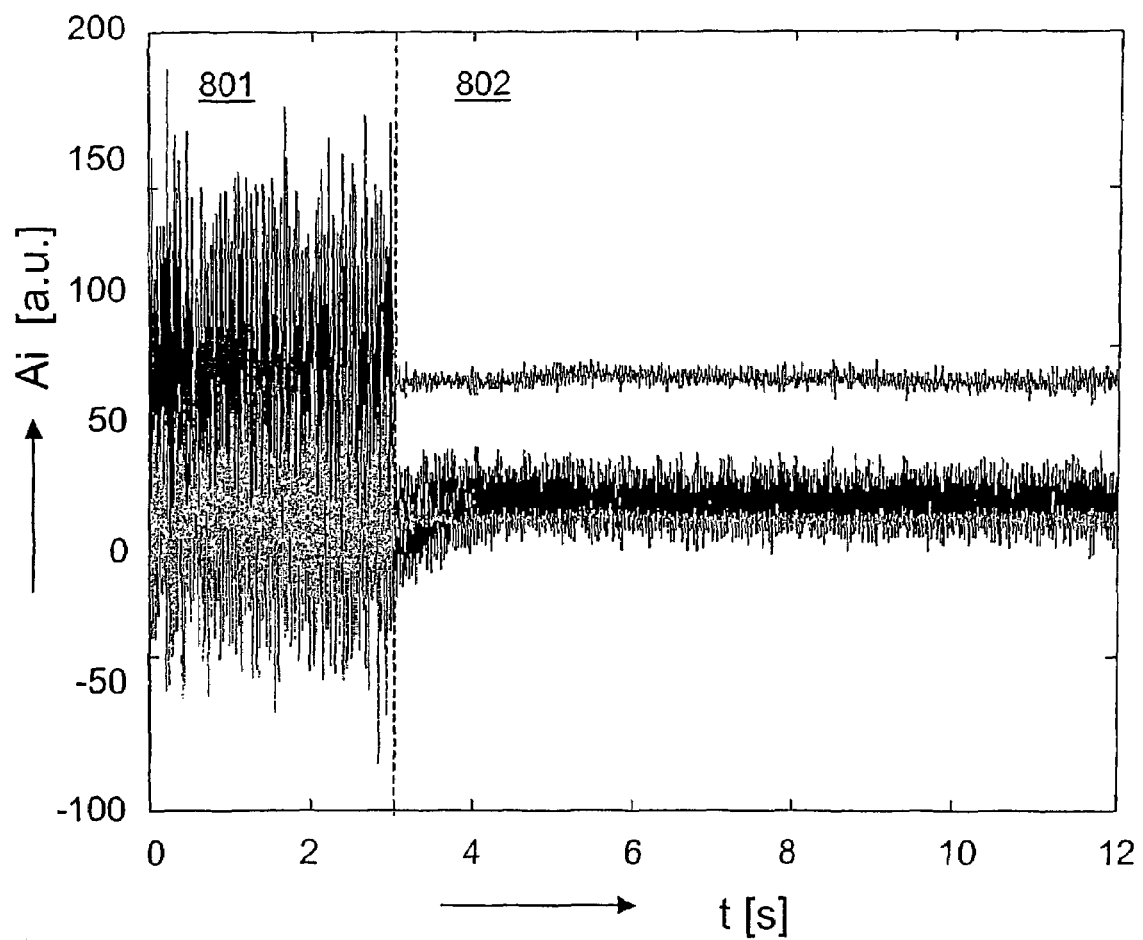
FIG. 8 is a diagram showing the time dependence of signals at the output of a controller according to the present invention.

At frequencies below 150 Hz, a standard control scheme according to the prior art was used. By the way of example, FIG. 8 illustrates the quality of the control that was achieved. This diagram shows some of the controller output signals Ai in arbitrary units (a.u.) as a function of time t. The TMP was first controlled at a rotation frequency of $\Omega/2\pi$=150 Hz by a prior-art scheme (region 801). Then the control scheme was switched to the inventive control scheme detailed above (region 802). The amplitude variations of the control signals Ai immediately decreased by typically more than a factor of five, indicating a stable control with very little output noise. Low output noise in a broad range of rotation frequencies is another advantageous property of the proposed control scheme, as low noise leads to an improved smoothness in operation.

Figure 9:
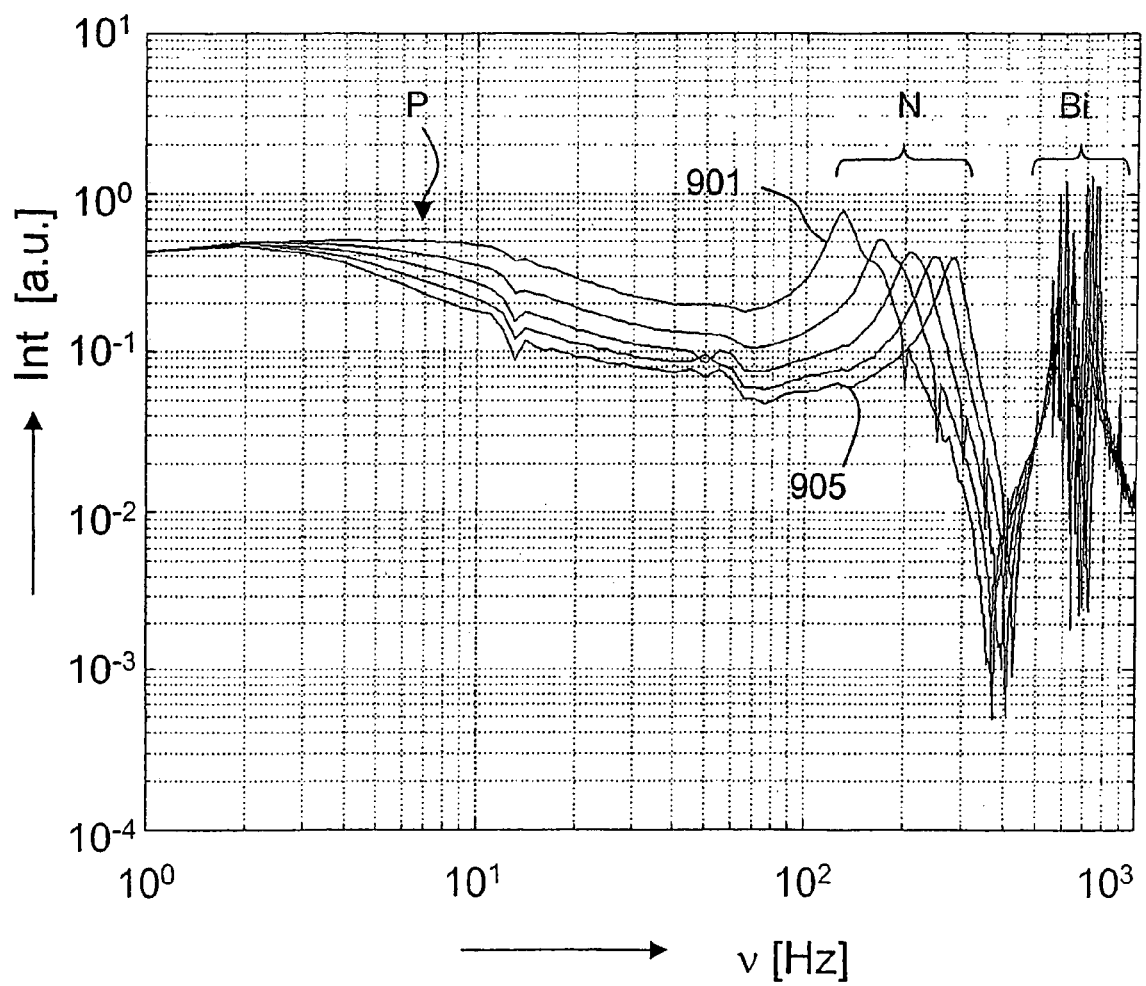
FIG. 9 is a diagram showing the frequency spectra of a rotor controlled with the method of the present invention at different rotation frequencies.

The achievable quality of control can also be seen in FIG. 9, in which the closed-loop frequency responses (amplitude Int, in arbitrary units a.u.) of the TMP are shown for several different rotation frequencies as a function of (absolute) frequency ν (in Hz). Spectrum 901 was recorded at a rotation frequency of $\Omega/2\pi$=200 Hz, while spectrum 905 corresponds to a rotation frequency of 400 Hz. The other spectra were taken at rotation frequencies between these values in steps of 50 Hz. Several resonances are visible in the spectra. The lowest-frequency resonance corresponds to the precession mode P. Suppression of this mode is extremely successful, as seen in the hardly measurable amplitude of the mode. The amplitude of the nutation mode N, while being more appreciable, decreases with increasing rotation frequency. This shows that a very stable control of the gyroscopic modes can be achieved even at high rotation frequencies. The amplitudes of any additional blade and bending modes Bi are smaller than or comparable to the amplitude of the nutation mode at all rotation frequencies, which shows that these modes are not influenced significantly or even excited by the control scheme.

It is within the scope of the present invention to provide different control schemes at different frequencies. Specifically, during start-up of the magnetic bearing device, a first control scheme, which can be an arbitrary control method including methods of the prior art, may be used at rotation frequencies $\Omega/2\pi$ of the rotor below a predetermined threshold frequency. For example, this control scheme can be a method in which each degree of freedom (translational and tilting DOF) is controlled independently by a single-input, single-output control unit. Only once the threshold frequency is reached and exceeded, the control is taken over by the control scheme according to the present invention. This may be advantageous because gyroscopic modes, to which the scheme of the present invention is specifically adapted, are less important at low rotation frequencies, and a "standard" control scheme with independent control units may be better adapted at low rotation frequencies. For the TMP of the above example, the threshold frequency was 150 Hz.

The above embodiment of a controller and method of control has successfully been applied to a variety of other magnetic bearing devices, with rotation frequencies up to 750 Hz. Stable control was achieved in all applications. Still higher rotation frequencies can easily be envisaged.

While one embodiment has been described in detail, other ways for implementing the invention are possible.

Instead of an implementation of a directional control unit 501 as shown in FIG. 7, e.g., an implementation with the aid of a discrete Fourier transform (DFT) is possible. For this, the directional control unit again has two inputs. In the directional control unit, a complex input variable is formed from the tilt displacement signals S$\theta$x and S$\theta$y at the inputs, of the form S$\theta$=S$\theta$x+j*S$\theta$y, where $j^2$=−1. S$\theta$ is sampled at discrete points in time t. Let $\omega$ designate the predetermined angular frequency of a selected mode to be controlled. A positive sign indicates a forward mode, a negative sign indicates a backward mode. In the directional control unit for a forward mode, the expression DFW($\omega$;t)=S$\theta$(t)·exp(−j|$\omega$|t) is formed and subjected to a lowpass filter. Mathematically, the lowpass filter roughly corresponds to a (finite) integration over time. Thus, in mathematical terms, the approximate value of the DFT of the complex signal at frequency $\omega$ (the approximate Fourier component of the signal at frequency $\omega$) is obtained. This is transformed back by forming the expression S$\theta$FW ($\omega$;t)=LP(DFW($\omega$;t))·exp(j|$\omega$|t), where LP( . . . ) indicates lowpass filtering. The result is a complex, time dependent signal S$\theta$FW. Finally, the signal S$\theta$FW is split up into a real part and an imaginary part to yield separate control signals A$\theta$x and A$\theta$y for the x and y directions. These signals are substantially different from zero only if the input signals, i.e. the tilt displacement signals S$\theta$x and S$\theta$y, have a component with a predetermined circular polarization, i.e., if they have a component which corresponds to tilt displacements with a tilt vector rotating around the device axis z with a first predetermined sense of rotation. Altogether, this DFT scheme acts as a combined filter for frequency and circular polarization.

If the lowpass filter employed is a first-order filter, the transfer function for this DFT scheme is the same as for the implementation with two coupled integrators, as in block 710 of FIG. 7. If a higher-order filter is employed, the transfer function is the same as for an implementation with more than two coupled integrators. Accordingly, in block 710 of FIG. 7, more than two integrators could be employed to give a different (more narrow-banded, higher-order) frequency response.

In analogy, in a directional control unit for a backward mode at a predetermined frequency $\omega$, DBW($\omega$;t)=S$\theta$(t)·exp (−j|$\omega$|t) and $$S\theta BW(\omega;t)=LP(DBW(\omega;t))\cdot \exp(-j|\omega|t)$$

would be computed. The input or output of the DFT will generally be subjected to a further phase rotation by a fixed, predetermined phase in order to achieve optimum damping. In hardware, this phase rotation is readily implemented by a module such as block 701 in FIG. 7. In software, it corresponds to a multiplication of the complex input or output signal by exp(j$\phi$) with a predetermined phase angle $\phi$.

If the directional control signals are to be separated into forward and backward components only, without applying a simultaneous frequency filter, this can be achieved by performing the above-described procedure for a discrete grid of frequency values $\omega$ and summing the resulting output signals S$\theta$FW($\omega$;t) and S$\theta$BW($\omega$;t), respectively, over all values of $\omega$. The result is a pure circular polarization filter without additional frequency filtering.

All these operations can be performed in software or hardware, as described above.

In a hardware embodiment, operation equivalent to the above-described DFT implementation can be achieved, e.g., by employing a so-called tracking filter. Tracking filters are well known in the art for other purposes, such as unbalance compensation. An example is given in U.S. Pat. No. 4,697, 128.

Figure 10:
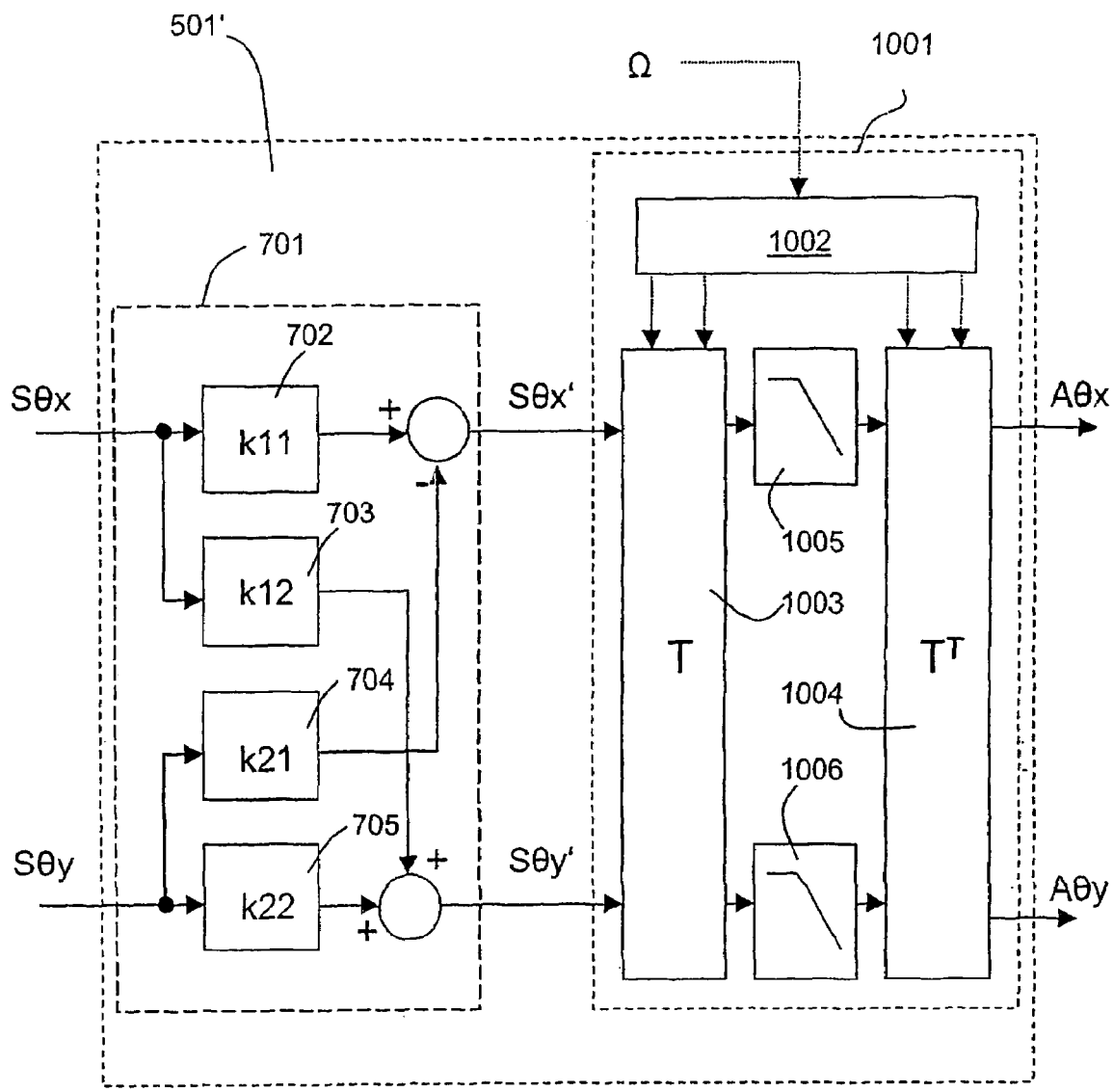
FIG. 10 is a block diagram of a control unit according to an alternative embodiment of the present invention.

An embodiment of a (forward) directional control unit 501' employing a specifically adapted tracking filter is shown in FIG. 10. As such, it implements a combined filter for a predetermined circular polarization and a predetermined frequency of the signals at its inputs. The unit comprises two independent blocks 701 and 1001. Block 701 is identical to the corresponding block in FIG. 7. As described in connection with FIG. 7, this block serves to shift the phase of the input signals (in other words, rotate the coordinate system by a predetermined phase angle) such that optimal damping of the selected mode to be damped by the subsequent tracking filter is achieved. Instead of being arranged before (upstream of) block 1001, it could also be arranged behind block 1001 (downstream).

Block 1001 implements a tracking filter. It comprises a sine/cosine generator 1002, a transformation unit 1003, two lowpass filters 1005 and 1006, and an inverse transformation unit 1004. These units will now be described in more detail.

The sine/cosine generator receives at its input a measure of the angular velocity $\Omega$ of the rotation, e.g., in the form of pulses from a pulse sensor or from a so-called resolver. Based on this frequency, it determines the expected angular frequency $\omega$ of the mode to be damped, e.g., the nutation frequency, and provides at its outputs a pair of signals proportional to cos $\omega$t and sin $\omega$t, respectively. This pair of signals is fed to the transformation units 1003 and 1004.

The transformation unit 1003 acts to transform the signals S$\theta$x', S$\theta$y' at the output of block 701 into a rotating frame (a coordinate system rotating with frequency $\omega$). To this end, it performs a matrix multiplication of the matrix $$T = \begin{pmatrix} \cos\omega t & \sin\omega t \\ -\sin\omega t & \cos\omega t \end{pmatrix}$$

with the vector $$\begin{pmatrix} S\theta x' \\ S\theta y' \end{pmatrix}.$$

This is equivalent to forming the expression DFW' ($\omega$;t) =S$\theta$'(t)·exp(−j$\omega$t) in the DFT implementation above, where S$\theta$'(t)=S$\theta$x'+j·S$\theta$y'. Both outputs of the transformation unit 1003 are then subjected to lowpass filtering. The resulting signals are subsequently transformed back by matrix multiplication with the inverse matrix $T^{-1}=T^T$. This directly results in the control signals A$\theta$x and A$\theta$y for the x and y tilts. If a backward directional control unit were to be implemented, $\omega$ will have to replaced by −$\omega$ in the above expressions.

In the above embodiments, sensors are present to directly provide displacement signals in three mutually orthogonal directions. Likewise, in the above embodiment, actuators act in orthogonal directions. However, in general, other arrangements are possible. The sensors do not necessarily need to provide displacement signals in the indicated orthogonal directions, as long as the measured displacement signals are suitable for determining the displacements for all five degrees of freedom to be controlled. Likewise, the directions of action of the actuators need not be mutually orthogonal. Suitable transformation schemes, e.g. for so-called conical bearings or for arrangements with two times three radial actuators, are well known in the art. The invention is also applicable for controlling magnetic bearing devices in which the axial bearing is not controlled actively.

The control method of the present invention can also be applied in other contexts than in the above-mentioned contexts. In an advantageous embodiment, the invention is applied to the control of a magnetic bearing device in a "touchdown" situation. For supporting the rotor during standstill, start-up of a magnetic bearing device or in emergency situations, usually auxiliary touchdown ball bearings are provided. In normal operation of the magnetic bearing device, these ball bearings are not operational. However, it may happen that through a sudden large disturbance, the shaft will touch one of these ball bearings at an elevated rotation frequency. This leads to a tilt of the shaft whose tilt vector rapidly rotates around the device axis at the rotation frequency of the rotor (i.e., the rotation of the tilt vector is synchronous with the rotor) and with the same sense of rotation as the rotor itself. Thus, a touchdown leads to a synchronous forward mode. It is very difficult to control and damp this mode with prior art schemes because standard control schemes are not adapted to properly respond to such a disturbance. With the schemes of the present invention, however, the motion of the rotor after an unplanned touchdown can be efficiently stabilized by selectively and rapidly damping the synchronous forward mode. For this purpose, a controller according to the present invention is provided which generates tilt control signals only for a forward mode at the rotation frequency. This controller is made narrow-banded in order not to influence control of other modes. It can be provided in parallel to further controllers. The same principle has also successfully been applied to sub-synchronous disturbances.

In another advantageous application, the invention is applied to the stabilization of the rotor at critical speeds (lateral critical speed, critical bending speed). At such rotation frequencies, large synchronous bending vibrations of the rotor shaft may be excited due to unbalance. In the prior art, this has been avoided by utilizing known unbalance compensation schemes for damping the bending vibrations. In the context of the present invention, a bending mode at a critical speed of the rotor can approximately be regarded as an synchronous forward mode, i.e., as a forward mode at the rotor frequency. With the schemes of the present invention, this mode can be selectively controlled by providing a forward control unit with narrowband frequency filtering at the rotor frequency. Again, such a unit can be provided in addition to other controllers which are adapted for controlling other modes.

While the invention has been described in connection with a TMP, it is apparent that the invention is not limited to such an application. The invention can be applied in any situation in which a rotor is supported for rotation by a magnetic bearing device. Examples include other types of pumps than TMPs, shafts in printing machines, shafts in electric power generators, etc.

The invention claimed is:

1. Method for controlling a magnetic bearing device, in which a rotor comprising a shaft is supported magnetically for rotation about a device axis, the bearing device comprising a plurality of electromagnetic actuators for exerting radial forces on the shaft and a plurality of sensors for detecting radial displacements of the shaft, the sensors providing sensor signals, the method comprising the steps of
from the sensor signals, deriving at least two displacement signals, each signal corresponding to a tilt displacement of the shaft in a predetermined direction;
from the tilt displacement signals, deriving one or more first tilt control signals; and
transforming the first tilt control signals for deriving actuator control signals for driving the electromagnetic actuators,
wherein deriving first tilt control signals comprises applying a filter for a first predetermined sense of rotation of the tilt vector around the device axis to the tilt displacement signals.

2. Method according to claim 1, wherein of deriving first tilt control signals comprises applying a combined filter for the first predetermined sense of rotation and for a predetermined frequency to the tilt displacement signals.

3. Method according to claim 2, wherein said predetermined frequency corresponds to a frequency of an eigenmode of the rotor.

4. Method according to claim 2 or 3, wherein said method further comprises:
determining a rotation frequency of the rotor;
depending on said rotation frequency, calculating said predetermined frequency; and
setting a center frequency of said filter to said predetermined frequency.

5. Method according to claim 1, characterized in that it further comprises:
scaling a first tilt displacement signal and adding it to a second tilt displacement signal for obtaining a transformed second tilt displacement signal; and
scaling the second tilt displacement signal and adding it to the first tilt displacement signal for obtaining a transformed first tilt displacement signal.

6. Method according to claim 1 comprises:
from the tilt displacement signals, deriving second tilt control signals which are substantially different from zero only for tilt displacement signals having a component which corresponds to tilt displacements with a tilt vector rotating about the device axis with a second predetermined sense of rotation opposite to the first predetermined sense of rotation;
combining the second tilt control signals with the first tilt control signals before deriving the actuator control signals.

7. Controller for controlling a magnetic bearing device in which a rotor comprising a shaft is supported magnetically for rotation about a device axis, comprising a tilt control unit for controlling tilting displacements of the rotor shaft (101), characterized in that said tilt control unit comprises a first directional control unit having at least two inputs for input signals and at least one output, said first directional control unit comprising a filter for a first predetermined circular polarization of the input signals.

8. Controller according to claim 7, wherein the first directional control unit comprises a combined filter for said first predetermined circular polarization and for a predetermined frequency.

9. Controller according to claim 8, wherein said controller further comprises frequency control means for determining a rotation frequency of said rotor and for controlling said predetermined frequency of said combined filter depending on said rotation frequency.

10. Controller according to claim 9, wherein said frequency control means are adapted to control said predetermined frequency of said combined filter such that it corresponds to the frequency of a predetermined eigenmode of said rotor.

11. Controller according to one of claims 7 to 10, wherein the first directional control unit comprises a first and a second integrator, each having an input and an output, that the output of the second integrator is coupled to the input of the first integrator via a first coupling unit, and that the output of the first integrator is coupled to the input of the second integrator via a second coupling unit, and that the sign of the coupling provided by the first coupling unit is opposite to the sign of the coupling provided by the second coupling unit.

12. Controller according to one of claims 7 to 10, wherein the first directional control unit further comprises a transformation block for implementing cross couplings between a first and a second input of the first directional control unit, said transformation block comprising a first cross-coupling branch for scaling a first signal at the first input and adding the scaled first signal to the signal at the second input to yield a transformed second signal, and a second cross-coupling branch for scaling a second signal at the second input and adding the scaled second signal to the first signal to yield a transformed first signal.

13. Controller according to one of the claims 7 to 10, wherein the tilt control unit further comprises a second directional control unit having a first input and a second input and at least one output, said second directional control unit comprising a filter for a second predetermined circular polarization opposite to the first predetermined circular polarization.

14. Controller according to one of the claims 7 to 10, wherein the tilt control unit comprises a plurality of directional control units having a first input and a second input and at least one output, each directional control unit comprising a combined filter for said first predetermined circular polarization and a predetermined frequency, wherein said predetermined frequency is different for each directional control unit.

15. Controller according to one of claims 7 to 10 for a bearing device comprising a plurality of electromagnetic actuators for exerting radial forces on the shaft and a plurality of sensors for detecting radial displacements of the shaft and providing sensor signals, wherein the controller further comprises a first transformation unit for transforming the sensor signals to yield at least two tilt displacement signals, each tilt displacement signal corresponding to a tilt of the shaft in a predetermined direction, that the tilt displacement signals are fed to the tilt control unit, that the tilt control unit has at least two outputs providing tilt control signals, and that the controller further comprises a second transformation unit for transforming the tilt control signals to actuator control signals for driving the electromagnetic actuators.

16. Magnetic bearing device for magnetically supporting a rotor comprising a shaft for rotation about a device axis, wherein the magnetic bearing device comprises a controller according to one of claims 7 to 10.

17. Turbo-molecular pump, comprising a magnetic bearing device and a rotor with a plurality of rotor blades supported by the magnetic bearing device, wherein it comprises a controller according to one of the claims 7 to 10.

18. Controller according to one of claims 8 to 10, wherein said combined filter comprises a tracking filter centered around said predetermined frequency.

\* \* \* \* \*